July 14, 1970          J. MULLIGAN          3,520,500
AIRCRAFT EJECTION SYSTEM
Filed Aug. 2, 1968
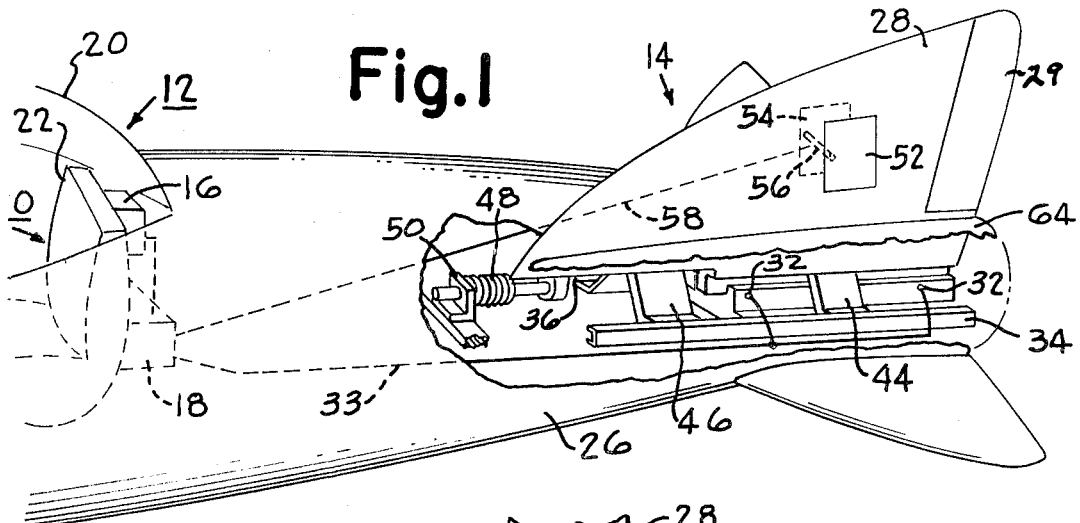
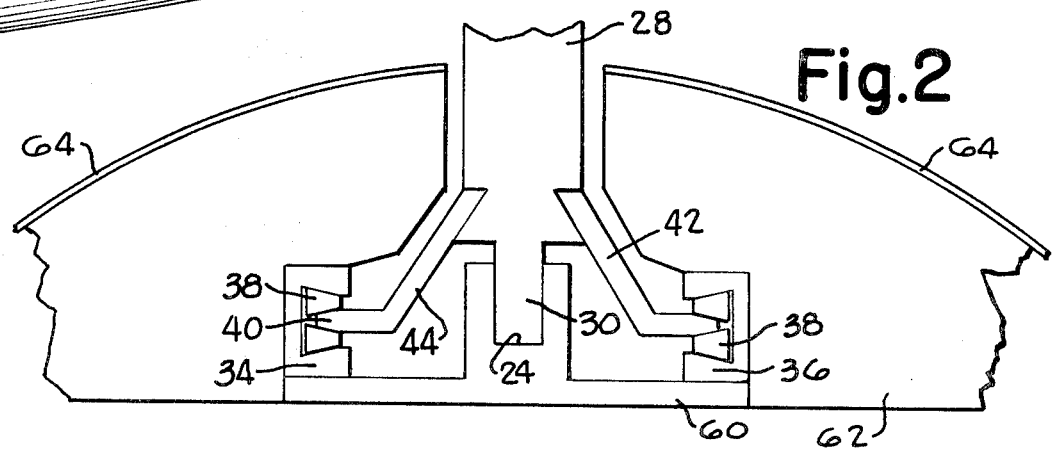
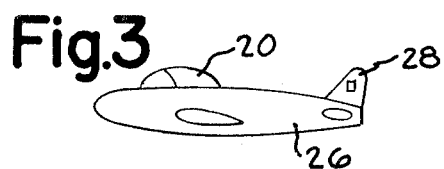
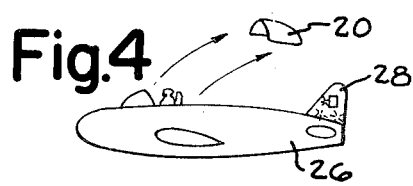
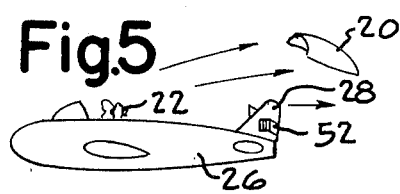
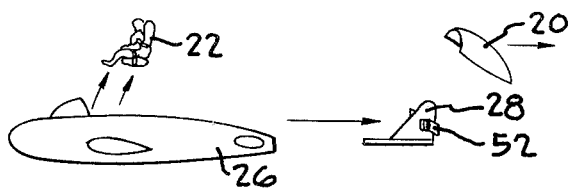
INVENTOR
JAMES MULLIGAN
BY *Winton C. Jacobs*
ATTORNEY United States Patent Office 3,520,500
Patented July 14, 1970

3,520,500
AIRCRAFT EJECTION SYSTEM
James Mulligan, 112 E. Broad St.,
Palmyra, N.J. 08065
Filed Aug. 2, 1968, Ser. No. 749,678
Int. Cl. B64c 1/32, 9/02; B64d 25/10
U.S. Cl. 244—122                              6 Claims

ABSTRACT OF THE DISCLOSURE

An aircraft ejection system employs a tail assembly slidably mounted on tracks, which is actuated to be detached from the aircraft when the ejection-seat system is actuated in an emergency. Special surfaces on the tail are effective to propel the tail assembly.

---

This invention relates to safety apparatus for ejecting the occupants of high-speed aircraft in case of emergency.

In high-speed aircraft, ejection seats are provided for actuation by the pilot or other occupant in an emergency. These seats are powered by gun-type catapults and rocket motors for lifting the occupant high above the aircraft where his parachute can be safely operated. Where the emergency occurs close to zero altitude, the occupant must be atapulted sufficiently high for proper operation of the parachute. At normal altitudes, the occupant must be atapulted high enough to clear the empennage or tail assembly of the aircraft. This catapulting requires the application of large accelerations to the occupant to attain the required height of clearance, and consequently the associated forces may produce severe and dangerous injuries to his body. For example, the spinal column may be shocked by the exploding charge in the ejection seat, and the more violent the departure, the more likely an injury due to hitting some part of the cockpit.

Accordingly, it is among the objects of this invention to provide a new and improved ejection system for aircraft.

Another object is to provide a new and improved aircraft structure so that ejected occupants will not encounter aircraft obstacles, whereby ejection accelerations of a lower level may be employed with greater safety for the ejected occupant.

In accordance with one embodiment of this invention, an aircraft ejection system employs a tail assembly that is detachably mounted for sliding movement off the tail end of the aircraft. An ejection seat is provided for the occupant, with actuator controls that also initiate detachment of the tail assembly just prior to the catapulting of the seat. The detachment of the tail assembly releases fastenings therefor and moves spoiler surfaces thereon for catching the slipstream and propelling the tail assembly back and clear of the aircraft.

The foregoing and other object of this invention, the features thereof, as well as the invention itself, may be more fully understood from the following description when read together with the accompanying drawing, in which:

FIG. 1 is a perspective view of a fragment of an aircraft fuselage having a detachable tail assembly embodying this invention;

FIG. 2 is a rear view of the slidable mounting of the tail assembly of FIG. 1 as viewed from line 2—2; and FIGS. 3 through 6 are schematic views of the aircraft of FIG. 1, illustrated in different stages of operation of the ejection system.

In the drawing, corresponding parts are referenced throughout by similar numerals.

The aircraft of FIG. 1 incorporates an ejection-seat system 10, a canopy-jettison system 12, and a tail-assembly removal system 14. The ejection-seat and canopy-jettison systems 10 and 12 are generally of any conventional construction (except as noted below) and their details are omitted for simplicity. In operation, the pilot or other occupant initiates the ejection by operating an actuator 16, which, by way of controls 18, actuates the jettisoning of canopy 20, and thereafter the catapulting of seat 22.

The tail-assembly removal system incorporates a slidable mounting, which comprises a central rectangular track 24 extending longitudinally along the fuselage 26 most of the length of the fin up to the rear end of the fuselage. Depending from the fin 28 is a rectangular key and guide 30 which is slidable in track 24 and normally retained therein by quick-disconnect (e.g., explosive) bolts 32, that are operated via control lines 33 from ejection controls 18. A pair of tracks 34, 36 extend parallel to and on either side of the central track 24 and contain two rows of roller bearings 38 along the length thereof. These bearings 38 are frusto-conical, and an oppositely oriented bearing 40 is positioned therebetween to form a lateral thrust bearing. A bearing 40 is attached at the end of each of a pair of outrigger arms 42, 44 that extend from the fin 28. Similar pairs of outrigger arms 46 are repeated as are needed for lateral stability.

Means are provided to propel the fin 28 backwards along the tracks 24, 34 and 36 until it eventually slides clear of the aircraft at the rearmost point of the fuselage. For this purpose a spring 48, mounted between the forward end of the fin 28 and a suitable member 50 affixed to the fuselage, biases the fin backwards so as to initiate movement of the fin when the bolts 32 are disconnected. In addition, a pair of wind buffers or spoiler doors 52, 54 are mounted on the opposite side surfaces of the fin. These doors have surfaces that are normally co-extensible with the fin surfaces. When the fin is to be removed, the doors pivot outwardly from the fin to engage the slipstream of the aircraft and propel the fin backwards and clear thereof. The opening of the doors 52, 54 occurs after the bolts 32 are disconnected and initial movement of the fin is produced by the bias spring 48. The opening of the doors 52 and 54 may be mechanically controlled by the movement of the fin itself, which movement actuates a compressed air bottle linked to the doors to move them outwardly from the fin surface. Alternatively, control arms 56 are linked to the doors and retain them in their closed position; these arms are extensible and are released to the extended position by an electrical control line 58 connected to the ejection controls 18. The line 58 is actuated in proper time relationship as explained above.

The various electrical or hydraulic fittings that are normally connected from the aircraft fuselage to the fin are separated upon separation of the fin in any suitable fashion; e.g., quick-disconnect fittings that are self-contained upon movement of the fin are one appropriate construction. Various arrangements may be used to break the control linkage to the rudder portion 29 of the fin 28, when the latter is to be released. For example, explosive couplings may be used for this purpose in a fashion similar to the bolts 32. Alternatively, the control linkage may be constructed to have parts that separate upon release of the fin. One suitable form of separating control linkage that may be used is a pair of separable disengaging gears inserted in a conventional operating shaft for the rudder 29. Thus, one portion of the shaft is mounted on the fuselage air frame for operation by the usual cables and terminates in a first gear; the latter meshes with a similar second gear on another shaft portion coupled to operate the rudder. In normal operation, the gears transmit the control shaft movements. The rudder gear is located behind the fuselage gear, so that rearward movement of the fin is not interfered with. When the fin 28 is released and starts to slide along the tracks 34, 36, the rudder gear disengages and separates from the fuselage gear, so that there is no interference with the rearwardly sliding fin. Upon separating movement of the fin with respect to the fuselage, these rudder-control gears merely separate and disengage.

The tracks 24, 34 and 36 are preferably formed in a rigid integral base 60, which includes a large circular ribbing or bulkhead (only the upper portion 62 of which is shown in FIG. 2) which is located within the outer shell 64 of the aircraft fuselage and the tail thereof and which surrounds and is secured to the ribbing framework through which the jet engine passes, whereby the ribbing 62 itself surrounds the engine, and the track base 60 is positioned above the engine to support the fin securely in vertical position.

In operation, the fin 28 is firmly secured in operating position and control condition in normal flight, as indicated in FIG. 3. In an emergency condition during ordinary flight, the pilot or other occupant operates an actuator 16 which initiates a series of control operations via controls 18. The canopy-ejection system is actuated for release and ejection of the canopy 20 (FIG. 4). At substantially the same time, the quick-disconnect bolts 32 are operated via the control lines 33, which release the rigid connection of the fin to the track 24. Thereupon, the bias spring 48 is effective to move the fin backwards (FIG. 5), with the guide 30 riding in track 24 and the bearings 40 sliding in tracks 34 and 36. When movement of the fin 28 is started, the spoiler doors 52 are opened sufficiently to catch the slipstream and provide a continuing propelling force to complete the backward movement of the fin 28 off the rear end of the fuselage (FIG. 6).

With the obstacle of the tail assembly moving off the aircraft, it is clear for the pilot to be ejected in a slower and safer manner by means of the ejection-seat system 22. For example, the ejection system may incorporate two different modes of ejection, one being a high-power ejection suitable for "zero-zero" flight conditions, where a high ejection is required, and the second being a much lower discharge, using an ejection system of much lesser force. With the tail assembly detached from the aircraft, and no longer an obstacle, the low-force ejection-seat system is automatically operated to safely eject the occupant.

Various modifications of the above invention will be apparent to those skilled in the art. For example, different slidable mountings of the fin assembly, various types of quick-disconnect bolts, and different controls therefor and for the spoiler doors will be apparent from the above description, and suitable constructions will be apparent from the state of the art. Likewise, suitable ejection systems are well known in the art, including ejection seats having motor systems of different intensities for different ejection conditions, such as that described and shown in U.S. Pat. No. 3,190,589. Also, suitable controls and actuators with interconnected timing of the different stages of the system will be apparent from the above description. One suitable form of such controls for interrelating the seat ejection and canopy jettisoning is described and shown in U.S. Pat. No. 3,281,097.

Accordingly, a new and improved ejection system is provided for high-speed aircraft, in which the obstacle of the tail assembly is removed from the aircraft during emergency conditions, whereby the occupant may be ejected with moderate forces applied and thereby without the dangers of the high accelerations required for an ejection necessary to clear the tail assembly.

What is claimed is:

1. In an aircraft, a device for evacuating an occupant of a cockpit comprising:
   means for detachably mounting the vertical fin of the aircraft for sliding movement on the fuselage thereof;
   means for ejecting the occupant of the cockpit;
   and means operable from the cockpit for initiating detachment of the fin from the fuselage;
   whereby the fin may be detached from the fuselage and removed from the path of an ejected occupant.

2. In an aircraft, an evacuating device as recited in claim 1, and further comprising means for propelling the fin backwards and off the fuselage.

3. In an aircraft, an evacuating device as recited in claim 2, wherein said propelling means includes means for biasing the fin in a backward direction and effective to move the fin upon initiation of the detachment thereof.

4. In an aircraft, an evacuating device as recited in claim 2, wherein said propelling means includes means movable on said fin and including surfaces for engaging the slipstream of the moving aircraft.

5. In an aircraft, an evacuating device as recited in claim 2, wherein said mounting means includes a track assembly for lateral support of said fin during normal flight.

6. In an aircraft, an evacuating device as recited in claim 5, wherein said mounting means further includes explosive bolts, and said detachment initiating means includes control means for operating said bolts from the cockpit.

References Cited
UNITED STATES PATENTS

| | | | |
|---|---|---|---|
| 2,937,828 | 5/1960 | Clark et al. | 244—91 |
| 2,998,209 | 7/1961 | Creasey et al. | 244—87 X |
| 3,181,820 | 5/1965 | Burnelli | 244—87 |

MILTON BUCHLER, Primary Examiner

J. E. PITTENGER, Assistant Examiner

U.S. Cl. X.R.

244—87